T. E. VAN DERWERKEN.
RESILIENT WHEEL.
APPLICATION FILED AUG. 12, 1911.
1,044,951.
Patented Nov. 19, 1912.
2 SHEETS—SHEET 1.
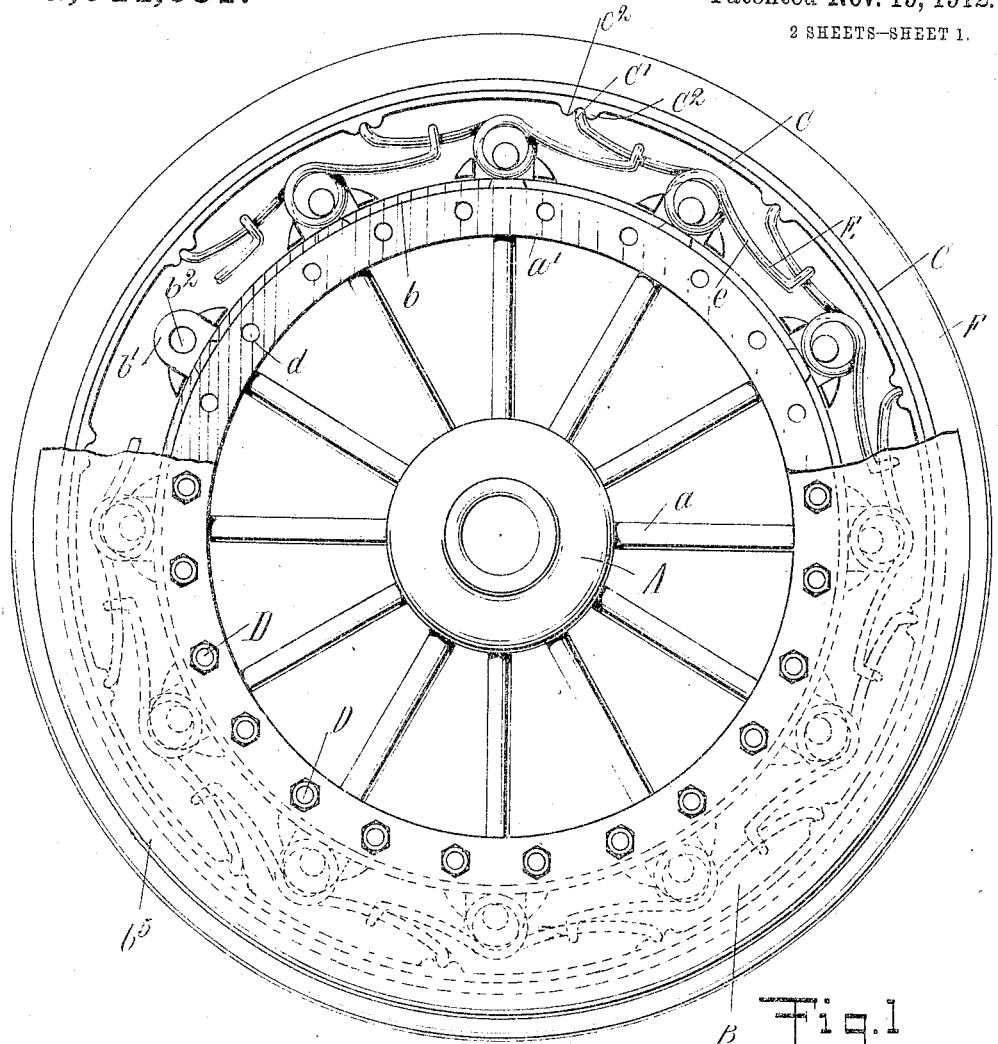
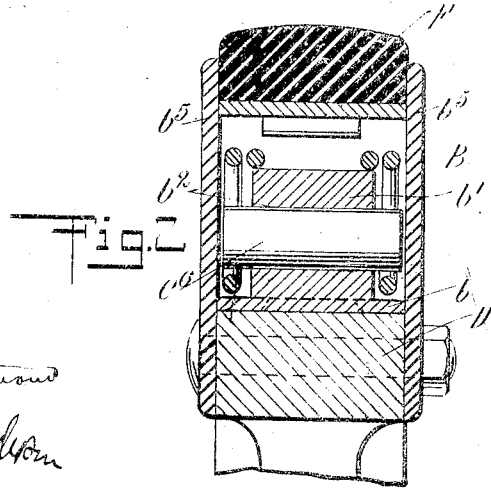
WITNESSES
INVENTOR
Theodore E. Van Derwerken
BY
ATTORNEYS

UNITED STATES PATENT OFFICE.

THEODORE EDDY VAN DERWERKEN, OF GREEN ISLAND, NEW YORK, ASSIGNOR OF ONE-HALF TO JAMES E. BROOKS AND CHARLES C. FINCH, OF ALBANY, NEW YORK.

RESILIENT WHEEL.

1,044,951.   Specification of Letters Patent.   Patented Nov. 19, 1912.

Application filed August 12, 1911. Serial No. 643,798.

*To all whom it may concern:*

Be it known that I, THEODORE E. VAN DERWERKEN, a citizen of the United States, and a resident of Green Island, in the county of Albany and State of New York, have invented a new and Improved Resilient Wheel, of which the following is a full, clear, and exact description.

The object of the present invention is to produce a vehicle wheel to resiliently support the load strains of a moving vehicle such as an automobile, and to take up and cushion the shocks incident to the moving of the vehicle over uneven roads without the use of pneumatic tires.

Reference is to be had to the accompanying drawings, constituting a part of this specification, in which similar characters of reference denote corresponding parts in all the views and in which—

Figure 3:
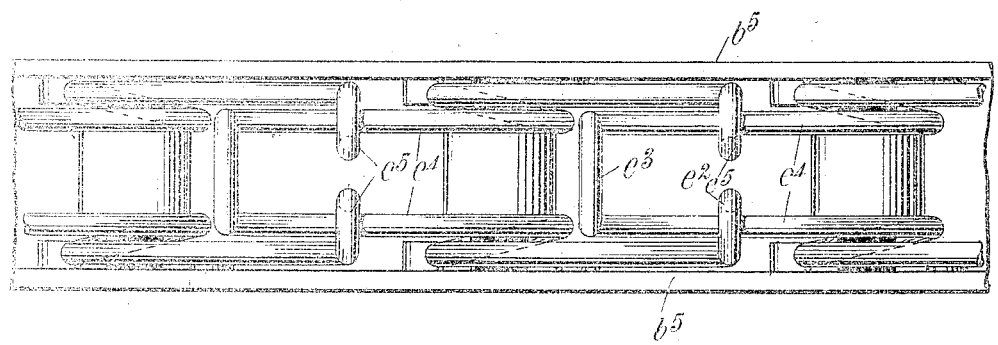
Figure 4:
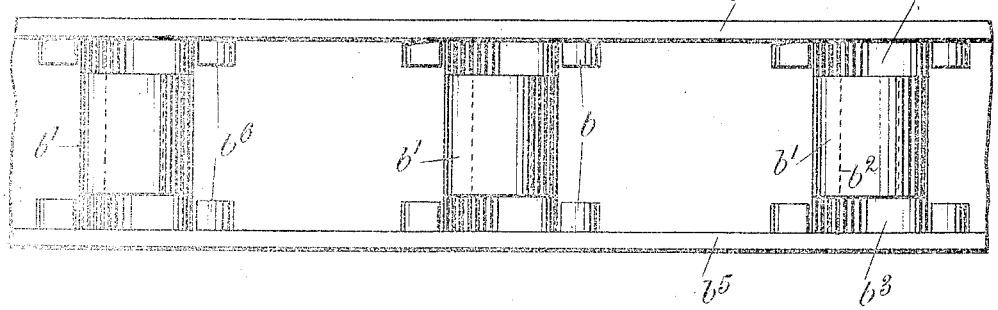
Figure 5:
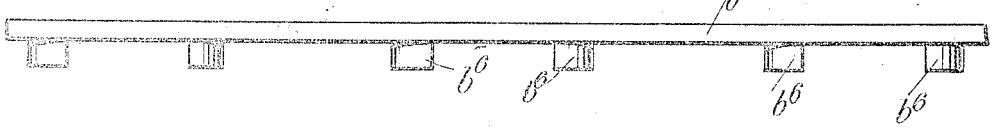
Figure 6:
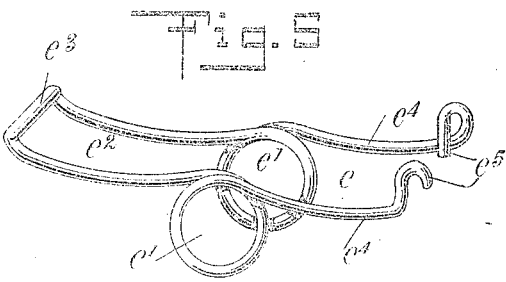

Figure 1 shows the wheel in side elevation embodying the invention, with a portion of one of the side plates broken away to show the underlying construction; Fig. 2 shows a transverse section through the rim and tire, and the resilient support for the tire taken on a radial line; Fig. 3 shows a top plan view of a portion of the resilient supporting devices laid out in a horizontal plane; Fig. 4 shows a top plan view of the base of the rim portion laid out in a horizontal plane, and also a portion of the side plates; Fig. 5 shows a top plan view of one of the side plates; and Fig. 6 shows a perspective view of one of the springs.

The wheel comprises a hub A provided with radial spokes $a$, which are fitted in one end of the hub A, and at their opposite ends in a felly $a'$, all of which parts may be of any usual or ordinary construction, as hereinafter set forth.

The wheel comprises a rim portion B and a tire portion C, between which is a resilient support E. The rim portion B consists of a base member $b$ consisting of a circular metallic casting of a diameter to closely fit the outer periphery of the felly $a'$ to which it may be secured in any suitable or convenient manner. The base $b$ is provided at intervals about its periphery with the radial extending bosses $b'$, there being as many of such bosses as there are supporting springs, as will be hereinafter set forth, and each of the bosses is provided with a bearing $b^2$ and they are somewhat less in length than the width of the base $b$, leaving at each end spaces or recesses $b^3$. The rim portion B further comprises circular side plates $b^5$ made of any desired metal and in the form of rings, the inner openings being substantially the diameter of the inner surface of the felly, and of such width as to project a sufficient distance beyond the base $b$ so as to form a trough or recess which receives the resilient supporting mechanism E and the tire portion C. The rim plates $b^5$ are securely connected to the felly $a'$ by means of bolts D which pass through said plates near their inner edges and through openings $d$ in the felly $a'$. The rim plates $b^5$ upon their inner faces and near their inner edges, will be provided with lugs or stops $b^6$ arranged in pairs, the members of each pair being at such a distance from each other as to form end stops for the recess $b^3$ at the opposite ends of the lugs $b'$. The tire portion C comprises a metallic ring $c$ circular in form and of a width to substantially fit the space between the rim plates $b^5$, and have a free sliding movement therebetween. The tire ring $c$ is provided upon its inner surface at intervals with the transversely extending seats $c'$ formed by the projections $c^2$, and it may be provided upon its external surface with any suitable sound deadening and cushioning tread surface F, preferably a solid rubber tire. The rubber tread F, however, is not depended upon to secure the cushioning and resilient action of the wheel, but it is secured by a series of springs $e$ constructed as shown in Fig. 6 of the drawing. These springs are made of wire which is bent to form the loops or bearings $e'$, and the bail $e^2$, extending from one side thereof, joined by the cross bar $e^3$ and the parallel arms $e^4$ extending from the opposite side of the bearing loops $e'$, and having at their free ends the inturned hooks $e^5$. There are as many of the springs $e$ employed as there are lugs $b'$ on the base $b$ of the rim portion, and they are mounted upon said lugs $b'$, the bearing loops being disposed at opposite ends of the respective lugs and engaged by pins $e^6$ which are passed through and seated in the bearings $b^2$ and which are of sufficient length to project at opposite ends beyond the lugs and to closely approximate the inner faces of the rim plates $b^5$. Thus the springs are securely held in their relative position but are permitted free movement with the pins $e^6$ as the center or fulcrum of such movement. The bail $e^2$ is connected directly with the inner face of the tire ring $c$ by means of the cross bar $e^3$ which is seated in the notches $c'$ between the shoulders $c^2$, and the arms $e^4$ of each of the springs are connected by means of the hooks $e^5$ to the adjacent spring in the series of springs, which hooks engage the arms of the bail $e^2$.

From the foregoing description, it will be observed that the tire portion C has a radial movement within the rim portion, and relatively to the hub and rim of the wheel, and as this radial movement is resisted by the springs $e$, the bails of which receive the direct thrust of the tire portion, which is transmitted by means of the arms $e^4$ to the adjacent springs; that is to say, the radial movement of the tire is not only resisted by the particular spring which may be at any time directly below the axle or hub, but it is to some extent assisted in its resistance by the radial movement of the tire under the load strains by the springs immediately adjacent thereto.

Having thus described my invention, I claim as new and desire to secure by Letters Patent:

1. A resilient wheel, comprising a rim portion, a continuous tire portion mounted upon the rim portion for radial movement thereon, springs mounted on the rim portion, means for connecting one end of the springs to the tire portion, pivotal supports for said springs intermediate the ends of the springs, and means for connecting the opposite ends of the springs to the arms of adjacent springs at one side of the pivotal supports.

2. A resilient wheel, comprising a rim portion, a continuous tire portion mounted thereon for radial movement with relation thereto, a plurality of springs secured to the rim portion bent to form intermediate eyes, a bail projecting from one end of said eyes and engaging the inner face of the tire portion, hooked arms projecting from the opposite side of said eyes and engaging the arms of the bail portion of an adjacent spring, and pivotal supports on the rim engaging the eyes of the springs.

3. A resilient wheel, comprising a rim portion, a continuous tire portion mounted upon the rim portion for radial movement thereon, springs comprising parallel members pivotally supported at points intermediate their ends upon the rim portion, the said springs at one end engaging the tire portion and at their opposite end engaging the parallel members of adjacent springs at one side of the pivotal supports.

4. A resilient wheel, comprising a rim portion, a continuous tire portion mounted upon the rim portion for radial movement thereon, springs comprising parallel members pivotally supported at points intermediate their ends upon the rim portion, seats on the inner face of the tire portion, the said springs at one end engaging the seats of the tire portion, and at their opposite ends engaging the members of adjacent springs.

5. A resilient wheel, comprising a rim portion, a continuous tire portion mounted upon the rim portion for radial movement thereon, springs comprising a piece of wire bent to form a cross bar at one end, and thence extending in parallel relation to each other, and having eyes at their intermediate portions, and hooks at their ends, means for connecting the eyes of said springs to the rim portion, seats upon the tire portion to receive the cross bar of said springs, and the hooks at the ends of said springs engaging an adjacent spring between the cross bar and the eyes.

In testimony whereof I have signed my name to this specification in the presence of two subscribing witnesses.

THEODORE EDDY VAN DERWERKEN.

Witnesses:
 CHAS. C. FINCH,
 CHAS. M. NADEAU.